(12) United States Patent
Zilnyk

(10) Patent No.: US 7,062,942 B2
(45) Date of Patent: Jun. 20, 2006

(54) METHOD OF MANUFACTURING GLASS OPTICAL FIBRE PREFORMS AND OPTICAL FIBRES

(75) Inventor: Anna Zilnyk, Harlow (GB)

(73) Assignee: Pirelli & C. S.p.A., Milan (IT)

( * ) Notice: Subject to any disclaimer, the term of this patent is extended or adjusted under 35 U.S.C. 154(b) by 114 days.

(21) Appl. No.: 10/478,833

(22) PCT Filed: May 27, 2002

(86) PCT No.: PCT/EP02/05789
§ 371 (c)(1),
(2), (4) Date: Nov. 26, 2003

(87) PCT Pub. No.: WO02/096816
PCT Pub. Date: Dec. 5, 2002

(65) Prior Publication Data
US 2004/0206128 A1 Oct. 21, 2004

(30) Foreign Application Priority Data
May 30, 2001 (EP) .................................. 01304735

(51) Int. Cl.
*C03B 37/025* (2006.01)
*C03B 37/027* (2006.01)

(52) U.S. Cl. ............................ 65/412; 65/435; 65/500; 65/428; 65/64

(58) Field of Classification Search ................. 65/412, 65/410, 411, 435, 477, 500, 428, 285, 64, 65/65, 120, 108, 109, 110
See application file for complete search history.

(56) References Cited

U.S. PATENT DOCUMENTS

| 3,679,385 | A | * | 7/1972 | Senft ........................ 65/60.51 |
| 4,154,591 | A | | 5/1979 | French et al. |
| 4,596,589 | A | | 6/1986 | Perry |
| 5,917,109 | A | * | 6/1999 | Berkey ....................... 65/412 |

FOREIGN PATENT DOCUMENTS

| DE | 197 16 133 A1 | 12/1997 |
| EP | 0 693 462 A1 | 1/1996 |
| GB | 2 244 269 A | 11/1991 |
| GB | 2 284 206 | 5/1995 |

(Continued)

OTHER PUBLICATIONS

Machine Translation, JP11139842, May 2005.*

(Continued)

*Primary Examiner*—John Hoffmann
(74) *Attorney, Agent, or Firm*—Finnegan, Henderson, Farabow, Garrett & Dunner, L.L.P.

(57) ABSTRACT

A method of making an optical fibre including providing an increased diameter portion on a rod. The rod is assembled by positioning the rod in a tube such that an annular gap is defined between an outer surface of the rod and an inner surface of the tube, and such that the increased diameter portion of the rod engages the tube and supports the rod with respect to the tube, and supporting the rod and tube assembly by gripping the tube. At the lower end of the rod and tube assembly, portions of the tube are collapsed onto the rod such that the tube portions fuse to the rod forming collapsed portions of the rod and the tube assembly. The collapsed portions are drawn to form an optical fibre. The vertically oriented rod and tube assembly can also be collapsed to form an optical fibre preform.

21 Claims, 3 Drawing Sheets

FOREIGN PATENT DOCUMENTS

| | | |
|---|---|---|
| JP | 62-216933 | 9/1987 |
| WO | WO 98/33746 | 8/1998 |
| WO | WO 99/09437 | 2/1999 |

OTHER PUBLICATIONS

Shunichiro, "Production of Preform for Optical Fiber", Patent Abstracts of Japan, of JP 11-139842 A, May 25, 1999.

Ryuozo, "Production of Glass Matrix for Optical Fiber", Patent Abstracts of Japan, of JP 02-160635 A, Jun. 20, 1990.

Akira, "Production of Optical Fiber Preform", Patent Abstracts of Japan, of JP 62-059547 A, Mar. 16, 1987.

Ikumi Toshirou et al., "Method for Molding Fiber For Optical Communication," Abstract of Japanese Patent No. JP60155542 (Aug. 15, 1985).

* cited by examiner

METHOD OF MANUFACTURING GLASS OPTICAL FIBRE PREFORMS AND OPTICAL FIBRES

CROSS REFERENCE TO RELATED APPLICATIONS

This application is a national phase application based on PCT/EP02/05789, filed May 27, 2002, the content of which is incorporated herein by reference, and claimes the priority of European Patent Application No. 01304735.2, filed May 30, 2001.

BACKGROUND OF THE INVENTION

1. Field of the Invention

The invention relates to the manufacture of optical fibre preforms by collapsing a sleeving tube onto a core rod and particularly, but not exclusively, to processes in which such a tube is collapsed onto a core rod during a fibre drawing process.

2. Description of the Related Art

In one known method of manufacturing an optical fibre preform, one or more sleeving tubes is collapsed onto a core rod placed within a sleeving tube. This method is described in U.S. Pat. Nos. 4,154,591 and 4,596,589. The method includes the steps of inserting the core rod into the sleeving tube and then slowly traversing a heat source along the length of the tube to collapse the tube onto the core rod. A suction force may be applied to the annular gap between the rod and the tube to assist the collapsing process.

Usually the melting of the sleeving tube onto the core rod takes place on a suitable lathe, followed by subsequent drawing of the optical fibre on a separate drawer tower. It has been recognised that carrying out these operations in two separate states has economic disadvantages and that it can be advantageous to collapse the sleeving tube onto the core rod and draw a fibre therefrom substantially simultaneously on one machine. A method for partially collapsing a sleeving tube onto a rod and then drawing the resultant preform in a continuous process on a drawing tower is disclosed in WO-A-9909437 (Pirelli Cavie Sistemi SpA).

JP-A-60155542 discloses another method in which a tube is collapsed onto a rod during the fibre drawing process. In this method, a rod and tube assembly is provided by positioning a rod in a tube such that an annular gap is defined between an outer surface of the rod and an inner surface of the tube. Adjacent end portions of the rod and tube are separately gripped by a holding device. The opposite ends of the rod and tube are fed into a heating furnace causing thermal collapse of the tube onto the rod. Downstream of the furnace, the newly collapsed portions of the rod are drawn to produce an optical fibre. The holding device is constructed to seal against the rod and the tube and defines a passage through which a suction force is applied to the annular gap to assist the collapse of the tube.

It has been recognised that an important aspect of the manufacture of optical fibre preforms and fibre production is the avoidance of the introduction of asymmetries in the preform geometry during fabrication and/or collapse of the preform into a solid mass, which asymmetries may be reflected in the cross-section of the resulting fibre, with consequent negative impact on the transmission properties of the fibre. In particular, it has been recognised that in order to avoid such asymmetries when manufacturing a simple two-layered preform by collapsing a tube onto a rod, particular attention should be paid in maintaining the tube centred onto the rod during the whole collapsing process. The applicant has recognised the need for a rod and tube assembly for optical fibre or optical fibre preform production that can be simply implemented and provide reliable centring of the tube.

SUMMARY OF THE INVENTION

With the present invention, it is provided a rod and tube assembly for optical fibre or optical perform production, which can be simply implemented and provides reliable centering of the rod and tube.

An aspect of the invention relates to a method of making an optical fibre, said method comprising the steps of:
  on a glass rod including an outer longitudinal surface and having a predetermined diameter, providing an increased diameter portion;
  positioning said rod within a glass tube defined by a peripheral glass wall having an internal and an external surface, respectively, wherein said glass tube has an internal diameter which is greater than said predetermined diameter of said rod and, at least in a portion thereof, smaller than the diameter of said increased diameter portion of the rod, thereby causing said increased diameter portion of the rod to be in engagement with said tube;
  vertically positioning and mechanically supporting said tube to provide a vertically oriented rod and tube assembly including an upper end zone and a lower end zone, wherein said mechanically supporting of said tube and said engagement of said increased diameter portion of the rod with said tube are carried out in a respective portion of the upper end zone of said assembly, thereby causing said rod to be vertically supported within said tube by said enlarged portion engaging said tube and to define an annular gap between the outer surface of said rod in the non-increased diameter portion thereof and the internal surface of said tube;
  providing a passage in said upper end zone of the assembly, below said increased diameter portion of the rod, in order to allow a fluid contained in said gap to flow out from said gap;
  thermally collapsing said tube onto said rod at the lower end zone of the rod and tube assembly, such that at least a portion of said tube fuses to said rod; and
  drawing an optical fibre from said collapsed portion of said rod and tube assembly.

Another aspect of the invention relates to a method of making an optical fibre preform, said method comprising the steps of:
  on a glass rod including an outer longitudinal surface and having a predetermined diameter, providing an increased diameter portion;
  positioning said rod within a glass tube defined by a peripheral glass wall having an internal and an external surface, respectively, wherein said glass tube has an internal diameter which is greater than said predetermined diameter of said rod and, at least in a portion thereof, smaller than the diameter of said increased diameter portion of the rod, thereby causing said increased diameter portion of the rod to be in engagement with said tube;
  vertically positioning and mechanically supporting said tube to provide a vertically oriented rod and tube assembly including an upper end zone and a lower end zone, wherein said mechanically supporting of said tube and said engagement of said increased diameter portion of the rod with said tube are carried out in a respective portion of the upper end zone of said assembly, thereby causing said rod to be vertically supported within said tube by said enlarged portion engaging said tube and to define an annular gap between the outer surface of said rod in the non-increased diameter portion thereof and the internal surface of said tube;

providing a passage in said upper end zone of the assembly, below said increased diameter portion of the rod, in order to allow a fluid contained in said gap to flow out from said gap;

thermally collapsing said tube onto said rod at the lower end zone of the rod and tube assembly, such that at least a portion of said tube fuses to said rod.

Preferably, the forming optical preform is subjected to a longitudinal elongation during the collapsing step. Preferably said rod includes a handle portion and said increased diameter portion is provided on said handle portion.

Preferably said increased diameter portion is provided by heating said rod at a predetermined position and axially compressing said rod.

Preferably said tube includes a handle portion and said increased diameter portion engages said tube handle portion.

The tube handle portion may comprise two tubular elements joined in end-to-end relationship, a first of said tubular elements defining an internal surface having a first internal diameter and a second of said tubular elements defining an internal surface having a second internal diameter which is greater than said first internal diameter, said second tubular element being disposed axially outwardly of said first tubular element so as to define an end of said tube.

The increased diameter portion may engage a step defined between an axially outward end of said first tubular element and an axially inward end of said second tubular element. At least one transverse aperture may be provided in said second tubular element and said step of gripping said tube comprises inserting a cooperably engagable member into the or at least one said aperture.

Advantageously, a suction force may be applied to said annular gap at least during a portion of said thermally collapsing step.

At least one passage may be provided in said rod, the or each said passage having a first end opening into said annular gap and a second end, wherein said suction force is applied to the or at least one said second end.

The or at least one said passage may include a portion extending substantially axially of said rod, such that the second end of the passage opens at a transverse end surface of said rod.

The or each said passage may be provided in said handle portion of the rod.

At least one passage may be provided in said tube, the or each passage having a first end opening into said annular gap and a second end, wherein said suction force is applied to the or at least one said second end. The or each said passage may be provided in said handle portion.

The increased diameter portion of the rod may sealingly engage the tube.

A sealing material may be provided to seal between said increased diameter portion and said tube.

In a continuous process of making an optical fibre, said drawing step is performed on newly collapsed portions of said preform.

BRIEF DESCRIPTION OF THE DRAWINGS

In order that the invention may be well understood, some embodiments thereof, which are given by way of example only, will now be described with reference to the drawings, in which.

DETAILED DESCRIPTION OF THE INVENTION

Figures 1, 4, 5:
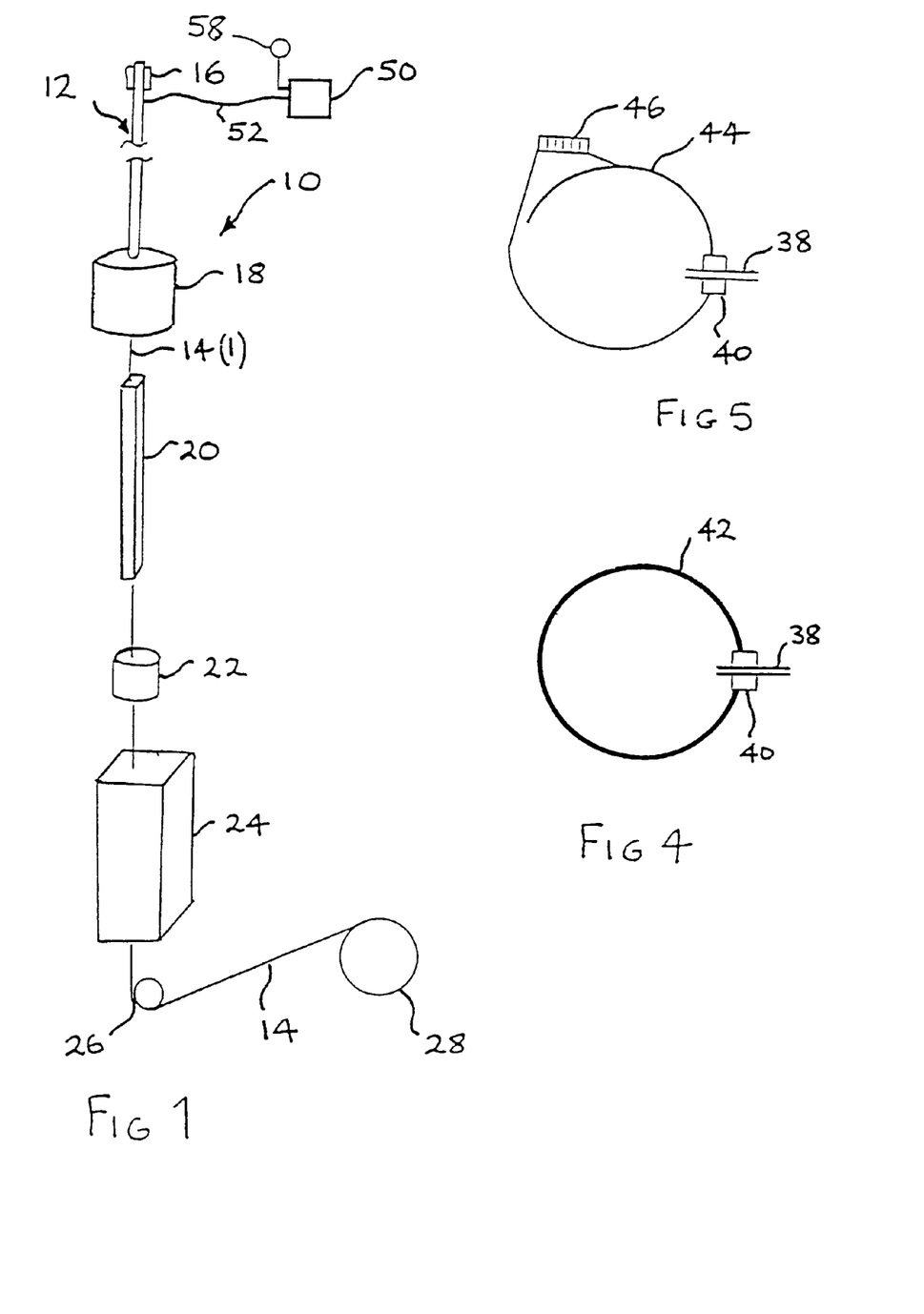
FIG. 1 is a schematic representation of an apparatus for producing an optical fibre.
FIG. 4 shows a spring clip for use with the rod and tube assembly.
FIG. 5 shows an alternative spring clip.

FIG. 1 shows schematically an apparatus 10 for drawing an optical fiber, hereinafter referred to as a drawing tower, for manufacturing an optical fibre. The drawing tower 10 processes a rod and tube assembly 12 (FIGS. 2 and 3) to produce an optical fibre 14.

The drawing tower 10 includes a holding device 16 which supports (e.g. by gripping) the rod and tube assembly and is arranged to feed the assembly into a drawing furnace 18. The rod and tube assembly emerges from the drawing furnace in the form of a drawn optical fibre 14(1) which is fed into a fibre cooling arrangement 20. On emerging from the fibre cooling arrangement, the cooled optical fibre enters a resin applicator 22 and the resin coated fibre is then fed into a UV curing oven 24 in which the resin coating, or coatings, are cured. It will be appreciated that the resin applicator may apply multiple resin coatings in a so called wet-on-wet application or there may be successive applicator/curing oven combinations to provide the required number of coatings. The coated optical fibre is drawn from the curing oven 24 by means of a capstan 26 and is fed from the capstan to a fibre take up bobbin 28 on which the resin coated optical fibre is spooled.

Figure 2:
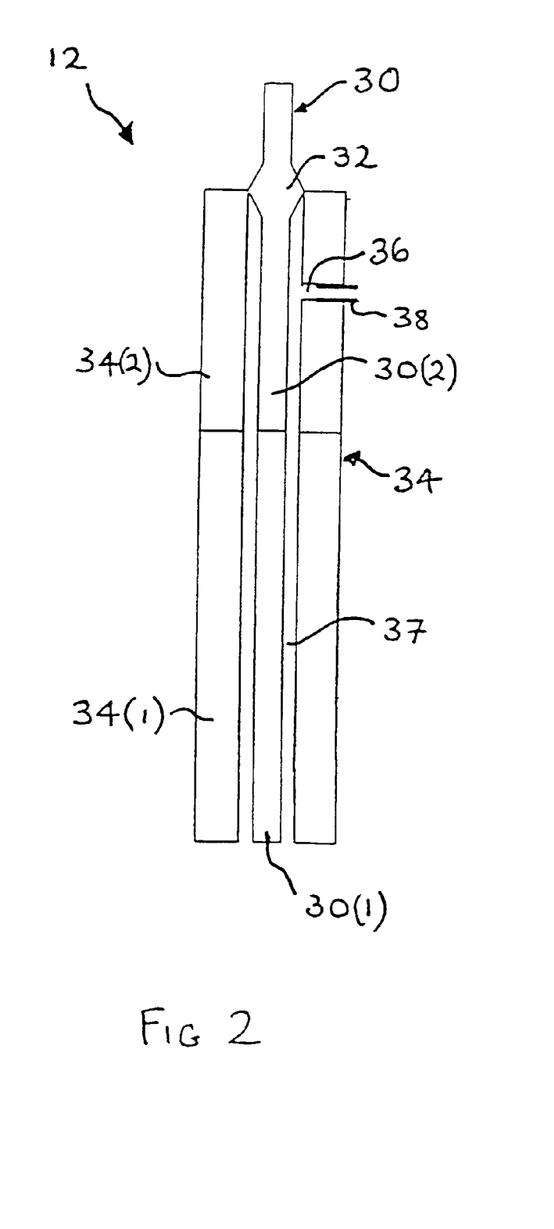
FIG. 2 is a schematic representation of a rod and tube assembly for use with the apparatus of FIG. 1.

FIG. 2 shows the rod and tube assembly 12 in more detail. The assembly includes a rod 30 which comprises core rod 30(1) of suitable doped silica, which may be produced by any known method such as the OVD (Outside Vapour Deposition) or VAD (Vapour Axial Deposition) process. The presently preferred production method is the MCVD (Modified Chemical Vapour Deposition) process. In the illustrated preferred embodiment core rod 30(1) has one end joined to an end of a handle, or dummy rod 30(2), which may be made of any suitable material, usually a quartz material. The rod 30 is provided with an increased diameter portion in the form of an annular rib 32. The rib 32 is provided on the dummy rod 30(2) and is substantially coaxial therewith. In the axial direction thereof the rib has a substantially hemispherical cross-section.

The rib 32 is produced by gripping the ends of the rod 30 in the jaws of a glass lathe (not shown) and rotating the rod, typically at 40 rpm, whilst applying heat to the rod at the position at which the rib is required. Typically, about 1 cm of the rod is heated to a softening point by means of an oxygen/hydrogen flame. Once the rod is suitably softened, one set of jaws is then moved approximately 1 cm towards the other set, which remains stationary. The compressive force applied by the moving jaws causes the heated section of the rod to bulge outwardly of the rod axis to define the rib 32. Typically, the diameter of the rib is around 4 mm greater than the diameter of the rod. Although not essential, the rib may be ground to improve the geometry.

The rod and tube assembly 12 additionally comprises a tube 34. The tube comprises a silica sleeve tube 34(1) and a tube handle 34(2) joined in end-to-end relationship using a burner flame. Prior to the joining together of the tube elements, the handle tube is drilled through one wall to produce a passage 36 extending transversely, and preferably perpendicular, to the tube axis. Typically, the hole would have a diameter in the order of 6 mm.

Typically, the core rod will have an outer diameter in the range 11 to 22 mm and the sleeve tube will have a diameter in the range 20 to 115 mm.

Prior to assembly with the rod 30, the tube 34 is cleaned; preferably by washing in a suitable detergent material, although cleaning may alternatively be carried out by flame heat treatment or liquid acid etching.

Figure 3:
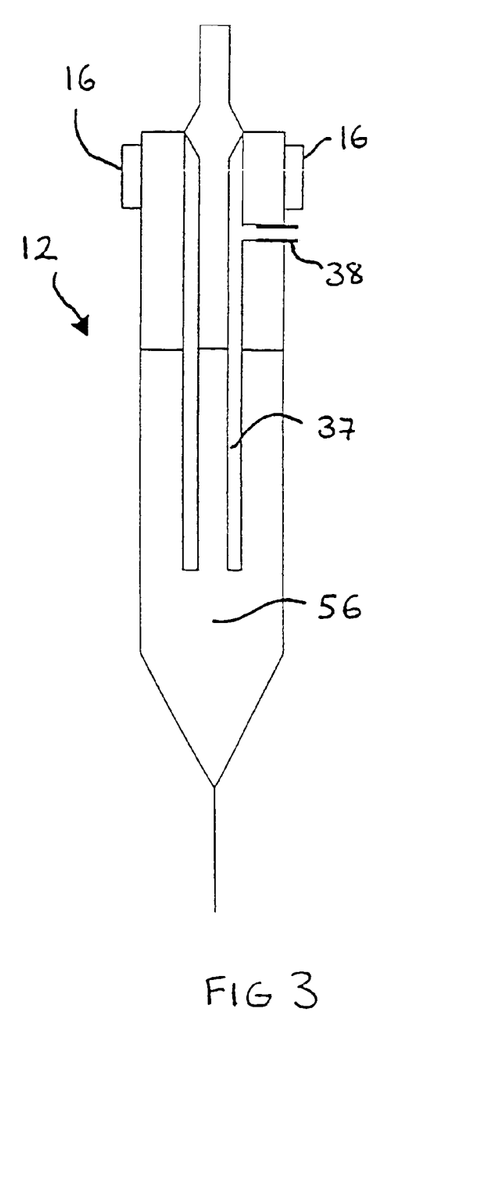
FIG. 3 is a schematic representation showing the rod and tube assembly being processed in the apparatus of FIG. 1.

The rod 30 is inserted into the cleaned tube 34 such that there is an annular gap 37 defined between the outer surface of the rod and the opposed inner surface of the tube. The rod is thus supported solely by the annular rib 32 seating in the free end of the tube handle 34(2). In addition to providing the connection between the rod and the tube, the rib centres the rod in the tube such that the two are arranged substantially coaxially. The core rod and tube are selected such that the gap 37 is preferably in the range 0.25 to 1.0 mm and preferably 0.5 mm. The gap between the dummy rod and tube handle may be somewhat larger, typically around 2.0 mm. The presence of a passage in the upper end portion of assembly 12, in particular of the passage 36 in the upper end portion of the tube 34, allows to maintain the annular gap 37 in fluid connection with the outside of the assembly 12, also once the tube 34 is thermally collapsed onto the rod 30 in the lower end portion of the assembly 12, as shown in FIG. 3.

The seating of the rib on the tube handle is such as to seal off one end of the annular gap 37. A relatively soft material such as PTFE (polytetrafluoroethene) tape may be used around the rib to aid sealing. When using other materials, the sealant may be applied in the form of a tape, O-ring or gasket. It is important to ensure that the sealant selected does not degrade to any significant extent when exposed to the elevated temperatures that are the result of heat transfer from the furnace 18.

A small piece of tubing 38 is positioned in the passage 36. As shown in FIG. 4, the tubing 38 is mounted in a block 40 to which is fitted an annular spring 42. The spring 42 serves to maintain the tubing 38 in place in the passage 36. One alternative to the spring loaded mounting device shown in FIG. 4 is illustrated by FIG. 5. The device shown in FIG. 5 has a metal coil 44 in place of the spring 42 and a spring 46 which applies tension to the coil.

The rod and tube assembly 12 is processed in the drawing tower 10 to produce a coated optical fibre. Referring to FIG. 3, the rod and tube assembly is inserted into the jaws 16 on the drawing tower. The jaws preferably grip the tube at the upper end of the tube handle 34(2), but could engage the tube handle at a position below the tubing 38. The tubing 38 is then connected to a vacuum source 50 (FIG. 1) by means of a flexible tube 52.

Once the rod and tube assembly 12 is connected to the vacuum source 50, the jaws 16 are moved downwardly towards the furnace 18 so that the free, or leading end of the assembly is inserted into the hot zone of the furnace. Once the leading end of the assembly has become molten, the vacuum source is activated to reduce the pressure in the annular space 37 causing the tube to collapse onto the rod and fuse to it to form a solid rod portion indicated generally at 56 in FIG. 3; a pressure reduction to the order of 1 Torr is presently preferred, but any suitable degree of vacuum may be employed. The optical fibre is then drawn from this rod portion 56 to produce the optical fibre 14(1). The vacuum source remains activated during the drawing procedure and a suitable vacuum gauge 58 (FIG. 1) may be provided to ensure that the sealing remains intact during the drawing procedure.

Figure 6:
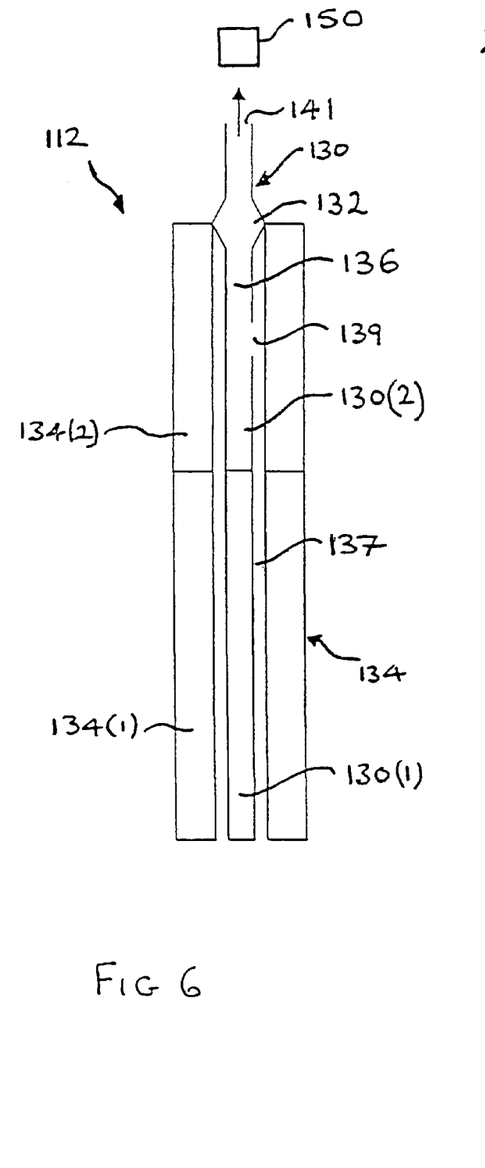
FIG. 6 is a schematic representation of an alternative rod and tube assembly.
Figure 7:
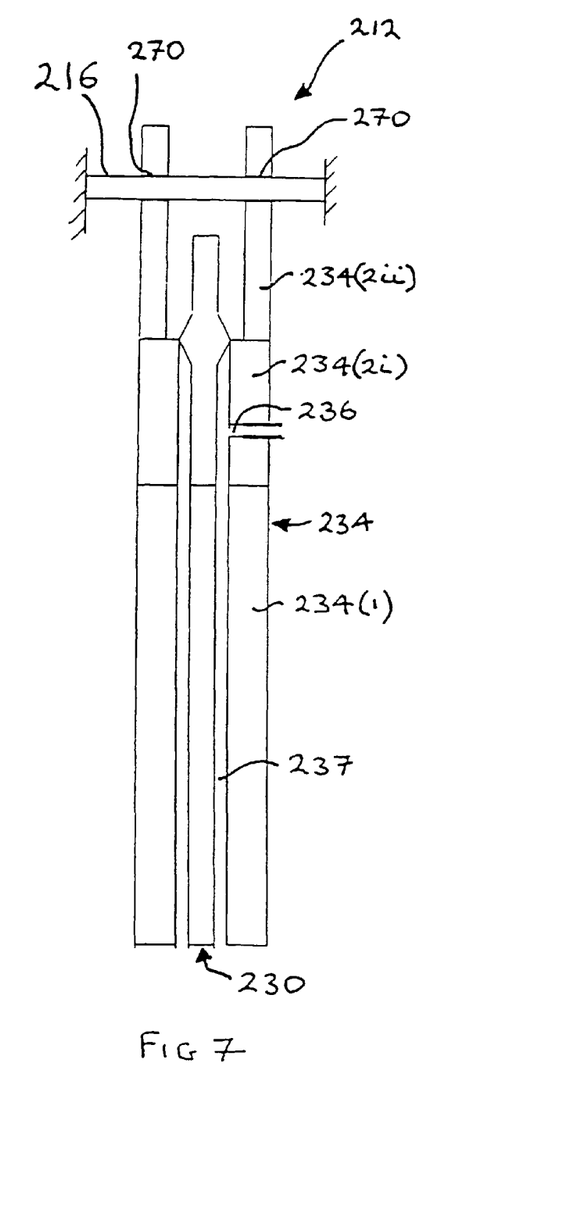
FIG. 7 is a schematic representation of another alternative rod and tube assembly.

FIGS. 6 and 7 illustrate modified rod and tube assemblies. For ease of description, like reference numerals, increased by 100 and 200 respectively, are used to indicate like components.

FIG. 6 shows a modified rod and tube assembly 112. In this assembly, there is a rod 130 which comprises a core rod 130(1) and a dummy rod 130(2) and a tube 134 that comprises a sleeve tube 134(1) and a handle, or dummy, tube 134(2). This assembly has no passage drilled in the tube. Instead an axially extending passage 136 is provided in the dummy rod 130(2) which is conveniently in the form of a tube. An aperture 139 is drilled into the side of the dummy rod so that the passage 136 opens at one end into the annular gap 137. At its other end 141, the passage can be connected by any suitable means, such as an flexible tube, to a vacuum source 150.

The rod and tube assembly 112 can be processed in the drawing tower 10 in exactly the same way as the assembly 12, the one difference being that vacuum may be applied to the annular gap 137 via the passage 136 in the dummy rod 130(2) rather than a passage in the dummy sleeve.

FIG. 7 shows another modified rod and tube assembly 212. The rod and tube assembly 212 differs from the assembly 12 in that the dummy tube comprises a first portion 234(2i) and a second portion 234(2ii).

The first dummy tube portion 234(2i) has the same inside and outside diameters as the sleeve tube 234(i) and is provided with a transversely extending passage 236 via which, during processing, vacuum can be applied to the annular gap 237 between the tube 234 and rod 230.

The second dummy tube portion 234(2ii) has the same outside diameter as the first dummy tube portion, but a larger inside diameter. The second dummy tube portion is secured to the end of the first dummy tube portion remote from the sleeve tube 234(1) in end-to-end relationship and, in use, defines in upper end of the rod and tube assembly.

Transversely extending apertures 270 are provided in the second dummy tube portion 234(2ii). The apertures are sized and arranged to permit the rod and tube assembly to be supported by a pin arrangement 216 as an alternative to the jaws 16 shown in FIGS. 1 and 3. Typically, the diameter of the apertures would be about 10 mm.

The rod and tube assembly 212 can be processed in the drawing tower 10 in exactly the same way as the assembly 10, the difference being that it can be supported by the known pin method rather than by chuck jaws or V clamps.

It will be appreciated that the rod and tube assemblies 12, 112 and 212 provide a simple and economical mounting arrangement permitting processing of the rod and tube in a drawing tower, such as the drawing tower 10, in which the sleeve is collapsed onto the rod and the newly collapsed portions are drawn to produce an optical fibre. Although, this is a preferred use of the rod and tube assemblies, it will be appreciated that they may alternatively be used to produce a preform by collapsing the tube onto the rod. The tube can be simply collapsed onto the rod or alternatively the whole assembly can be subjected to a longitudinal elongation during the collapsing step. The obtained solid preform can be later processed by drawing in the usual way to produce an optical fibre. Alternatively, said preform can be used as a rod on which a tube is thermally collapsed while drawing the fibre.

It will be understood that prior to the collapsing process, the rod is supported relative to the tube solely by engagement of the annular rib provided on the rod. By producing an annular rib with a suitable shape and also suitable selection of the relative dimensions of the rod and tube such that the distance between the circumferential surface of the rod and opposed inner surface portions of the tube is relatively small, for example in the range 0.5 to 2.00 mm, it has been found that the rod can effectively be centred in the tube without additional centring device(s). Thus, the assembly can be secured in suitable apparatus for processing to produce an optical fibre or an optical fibre preform simply by means of chucking in the jaws of a chuck or by known pin arrangements, which simply engage the tube and do not need any additional means to centre or support the rod.

It will also be appreciated that since the annular rib can be arranged to sealingly engage the tube to block one end of the annular gap between the rod and tube, there is no need to equip the holding device, which supports the rod and tube assembly during processing, with any form of sealing means. In particular, as the passage leading to the annular gap is provided below said annular rib, when a suction force is applied to said annular gap through said passage, the sealing engagement of said annular rib with said tube is advantageously increased. Furthermore, with a suitable passage or passages leading to the annular gap provided in the rod and/or tube, it is not necessary for the holding device to include passage means arranged to permit a suction force to be applied to the annular gap. Thus processing using standard holding equipment is facilitated.

The rod and tube assemblies 12, 112 and 212 have been shown with the rod and tube each having dummy portions. Whilst this is preferred, it will be appreciated that dummy portions are not essential and the entire rod and tube assembly may consist of a doped silica and silica suitable to produce an optical fibre having the desired qualities.

It will also be appreciated that the described processes are not material specific and that the processes may be used with any known combination of materials suitable for producing an optical fibre utilising the rod and tube collapsing method.

In the embodiments, collapsing is assisted by applying a suction force to the gap between the rod and tube. As is known to those skilled in the art, this step may be omitted, although it is generally considered advantageous to provide a positive pressure gradient between the inner and outer wall of the tube where it defines the annular gap.

It will be appreciated that whilst the presently preferred method for producing the rib is to compress of a heated rod portion, a rib could be provided by fixing an annular piece of glass, or the like, to the rod, preferably by fusing. In this case, the rod and tube assembly could either be used in a combined collapsing or drawing process or to form an optical fibre preform. In the latter case, the preform may be produced by traversing a flame along the length of the preform, which is preferably rotated simultaneously by means of the chuck gripping the tube.

In cases where the rod and tube assembly is to be used to produce an optical fibre preform, the preform may be formed by collapsing opposite end portions of the tube onto the rod as disclosed in WO-A-9909437.

It will be understood that although not presently preferred, the rib may be secured to the sleeve prior to the collapsing process. The preferred method of securement would be by fusing the two parts together.

In describing the embodiments, reference has been made to a core rod and a sleeve tube. In the simplest cases the core rod will form the optical fibre core and the sleeve the cladding. However, it is to be understood that the rod and/or tube may have layers of different dopants or dopant concentrations and accordingly, a radially outer annular portion of the core rod may form a part of the cladding and a radially inner annular portion of the sleeve tube may form a part of the optical fibre core.

It will be appreciated that whilst it is preferable that the rod and tube assembly is vertically oriented during the collapsing and/or drawing processes, absolute verticality is not essential and small variations from the vertical are intended to be encompassed in the scope of the invention as specified in the claims.

The invention claimed is:

1. A method of making an optical fibre comprising the steps of:
   a) providing an increased diameter portion on a glass rod, said glass rod including an outer longitudinal surface and a predetermined diameter;
   b) positioning said rod within a glass tube defined by a peripheral glass wall having an internal and an external surface, respectively, wherein said glass tube has an internal diameter which is greater than said predetermined diameter of said rod and, at least in a portion thereof, smaller than the diameter of said increased diameter portion of the rod, thereby causing said increased diameter portion of the rod to be in engagement with said tube;
   c) vertically positioning and mechanically supporting said tube to provide a vertically oriented rod and tube assembly including an upper end zone and a lower end zone, wherein said mechanically supporting of said tube and said engagement of said increased diameter portion of the rod with said tube are carried out in a respective portion of the upper end zone of said assembly, thereby causing said rod to be vertically supported within said tube by said increased diameter portion engaging said tube and to define an annular gap between the outer surface of said rod in the non-increased diameter portion thereof and the internal surface of said tube;
   d) providing a passage in said upper end zone of the assembly, below said increased diameter portion of the rod, in order to allow a fluid contained in said gap to flow out from said gap wherein said passage in said upper end portion of the assembly is provided on the wall of said tube, said passage having a first end opening on the internal surface of said tube into said annular gap and a second end opening on the external surface thereof towards the outside of said assembly;
   e) thermally collapsing said tube onto said rod at the lower end zone of the rod and tube assembly, such that at least a portion of said tube fuses to said rod; and
   f) drawing an optical fibre from said collapsed portion of said rod and tube assembly.

2. A method of making an optical fibre preform, comprising the steps of:
   a) providing an increased diameter portion on a glass rod, said glass rod including an outer longitudinal surface and having a predetermined diameter;

b) positioning said rod within a glass tube defined by a peripheral glass wall having an internal and an external surface, respectively, wherein said glass tube has an internal diameter which is greater than said predetermined diameter of said rod and, at least in a portion thereof, smaller than the diameter of said increased diameter portion of the rod, thereby causing said increased diameter portion of the rod to be in engagement with said tube;

c) vertically positioning and mechanically supporting said tube to provide a vertically oriented rod and tube assembly including an upper end zone and a lower end zone, wherein said mechanically supporting of said tube and said engagement of said increased diameter portion of the rod with said tube are carded out in a respective portion of the upper end zone of said assembly, thereby causing said rod to be vertically supported within said tube by said increased diameter portion engaging said tube and to define an annular gap between the outer surface of said rod in the non-increased diameter portion thereof and the internal surface of said tube;

d) providing a passage in said upper end zone of the assembly, below said increased diameter portion of the rod, in order to allow a fluid contained in said gap to flow out from said gap wherein said passage in said upper end portion of the assembly is provided in said rod, said passage having a first end opening into said annular gap and a second end in fluid connection with the outer ambient of said assembly; and e) thermally collapsing said tube onto said rod at the lower end zone of the rod and tube assembly, such that at least a portion of said tube fuses to said rod.

3. The method as claimed in claim 2, wherein said assembly is subjected to a longitudinal elongation during said collapsing step.

4. The method as claimed in claim 1 or 2, wherein said rod further comprises a handle portion and said increased diameter portion is provided on said handle portion.

5. The method as claimed in claim 4, wherein said increased diameter portion is provided by heating said rod at a predetermined position and axially compressing said rod.

6. The method as claimed in claim 1 or 2, wherein said increased diameter portion is provided by heating said rod at a predetermined position and axially compressing said rod.

7. The method as claimed in claim 1 or 2, wherein said tube includes a handle portion and said increased diameter portion of said rod engages said tube handle portion.

8. The method as claimed in claim 7, wherein said tube handle portion comprises two tubular elements joined in end-to-end relationship, a first of said tubular elements defining an intrnal surface having a first internal diameter greater than the predetermined diameter of said rod and smaller than the diameter of the increased diameter portion of said rod and a second of said tubular elements defining an internal surface having a second internal diameter which is greater than said first internal diameter and greater than the diameter of the increased diameter portion of said rod, said second tubular element being disposed axially outwardly of said first tubular element so as to define an end of said tube.

9. The method as claimed in claim 8, further comprising providing at least one transverse aperture in said second tubular element and said step of mechanically supporting said tube comprises inserting a cooperably engagable member into the or at least one said aperture.

10. The method as claimed in claim 1 or 2, further comprising applying a suction force to said annular gap through said passage provided in the upper end zone of the assembly, at least during a portion of said thermally collapsing step.

11. The method as claimed in claim 2, further comprising applying a suction force to said annular gap through said passage provided in the upper end zone of the assembly, at least during a portion of said thermally collapsing step, wherein said passage includes a first portion extending substantially axially along said rod and in fluid connection with the outer ambient of the assembly, and a second portion extending substantially transversely to said rod and in fluid connection with said first portion and with said annular gap.

12. The method as claimed in claim 11, wherein said rod further comprises a handle portion and said increased diameter portion is provided on said handle portion and wherein the passage is provided in said handle portion of the rod.

13. The method as claimed in claim 2, further comprising applying a suction force to said annular gap through said passage provided in the upper end zone of the assembly, at least during a portion of said thermally collapsing step, wherein said rod further comprises a handle portion and said increased diameter portion is provided on said handle portion and wherein the passage is provided in said handle portion of the rod.

14. The method as claimed in claim 1 or 2, wherein said increased diameter portion sealingly engages said tube.

15. The method as claimed in claim 14, wherein a sealing material is arranged to seal between said increased diameter portion and said tube.

16. The method as claimed in claim 1, wherein said tube includes a handle portion and wherein said increased diameter portion is provided by heating said rod at a predetermined position and axially compressing said rod and wherein said passage is provided in said handle portion.

17. A method of making an optical fibre comprising making an optical fibre preform as claimed in claim 2, and drawing said preform into an optical fibre.

18. A method of making an optical fibre preform, comprising the steps of:

a) providing an increased diameter portion on a glass rod, said glass rod including an outer longitudinal surface and having a predetermined diameter;

b) positioning said rod within a glass tube defined by a peripheral glass wall having an internal and an external surface, respectively, wherein said glass tube has an internal diameter which is greater than said predetermined diameter of said rod and, at least in a portion thereof, smaller than the diameter of said increased diameter portion of the rod, thereby causing said increased diameter portion of the rod to be in engagement with said tube;

c) vertically positioning and mechanically supporting said tube to provide a vertically oriented rod and tube assembly including an upper end zone and a lower end zone, wherein said mechanically supporting of said tube and said engagement of said increased diameter portion of the rod with said tube are carried out in a respective portion of the upper end zone of said assembly, thereby causing said rod to be vertically supported within said tube by said increased diameter portion engaging said tube and to define an annular gap between the outer surface of said rod in the non-increased diameter portion thereof and the internal surface of said tube;

d) providing a passage in said upper end zone of the assembly, below said increased diameter portion of the rod, in order to allow a fluid contained in said gap to flow out from said gap; and e) thermally collapsing said tube onto said rod at the lower end zone of the rod and tube assembly, such that at least a portion of said tube fuses to said rod, wherein said tube includes a handle portion and said increased diameter portion of said rod engages said tube handle portion, wherein said tube handle portion comprises two tubular elements joined in end-to-end relationship, a first of said tubular elements defining an internal surface having a first internal diameter greater than the predetermined diameter of said rod and smaller than the diameter of the increased diameter portion of said rod and a second of said tubular elements defining an internal surface having a second internal diameter which is greater than said first internal diameter and greater than the diameter of the increased diameter portion of said rod, said second tubular element being disposed axially outwardly of said first tubular element so as to define an end of said tube.

19. The method as claimed in claim 18, further comprising providing at least one transverse aperture in said second tubular element and said step of mechanically supporting said tube comprises inserting a cooperably engagable member into the or at least one said aperture.

20. A method of making an optical fibre preform, comprising the steps of:
   a) providing an increased diameter portion on a glass rod, said glass rod including an outer longitudinal surface and having a predetermined diameter;
   b) positioning said rod within a glass tube defined by a peripheral glass wall having an internal and an external surface, respectively, wherein said glass tube has an internal diameter which is greater than said predetermined diameter of said rod and, at least in a portion thereof, smaller than the diameter of said increased diameter portion of the rod, thereby causing said increased diameter portion of the rod to be in engagement with said tube;
   c) vertically positioning and mechanically supporting said tube to provide a vertically oriented rod and tube assembly including an upper end zone and a lower end zone, wherein said mechanically supporting of said tube and said engagement of said increased diameter portion of the rod with said tube are carried out in a respective portion of the upper end zone of said assembly, thereby causing said rod to be vertically supported within said tube by said increased diameter portion engaging said tube and to define an annular gap between the outer surface of said rod in the non-increased diameter portion thereof and the internal surface of said tube;
   d) providing a passage in said upper end zone of the assembly, below said increased diameter portion of the rod, in order to allow a fluid contained in said gap to flow out from said gap,
   wherein said increased diameter portion sealingly engages said tube; and
   e) thermally collapsing said tube onto said rod at the lower end zone of the rod and tube assembly, such that at least a portion of said tube fuses to said rod.

21. The method as claimed in claim 20, wherein a sealing material is arranged to seal between said increased diameter portion and said tube.

* * * * *

UNITED STATES PATENT AND TRADEMARK OFFICE
CERTIFICATE OF CORRECTION

PATENT NO. : 7,062,942 B2  Page 1 of 1
APPLICATION NO. : 10/478833
DATED : June 20, 2006
INVENTOR(S) : Anna Zilnyk

It is certified that error appears in the above-identified patent and that said Letters Patent is hereby corrected as shown below:

Claim 2, column 9, line 15, "carded" should read --carried--.

Claim 8, column 9, line 52, "intrnal" should read --internal--.

Signed and Sealed this

Thirteenth Day of February, 2007

JON W. DUDAS
*Director of the United States Patent and Trademark Office*